United States Patent

Chow

[15] 3,678,287

[45] July 18, 1972

[54] MAGNETIC DOMAIN LOGIC ARRANGEMENT

[72] Inventor: Woo Foung Chow, Berkeley Heights, N.J.

[73] Assignee: Bell Telephone Laboratories, Incorporated, Murray Hill, Berkeley Heights, N.J.

[22] Filed: May 28, 1971

[21] Appl. No.: 147,854

[52] U.S. Cl. .................307/88 LC, 340/174 TF, 340/174 SR

[51] Int. Cl. ..............G11c 11/14, G11c 19/00, H03k 19/168

[58] Field of Search..........................307/88 LC; 340/174 TF

[56] References Cited

UNITED STATES PATENTS 3,543,255 11/1970 Morrow et al....................340/174 TF

OTHER PUBLICATIONS

IBM Technical Disclosure Bulletin " Bubble Domain Logic Circuits" by Lin, Vol. 13, No. 10, 3/71 pp. 3019, 3020, 340–174 TF.

IBM Technical Disc. Bulletin, " Bubble Domain Logic Inverter" by Alanasi, et al., Vol. 13, No. 6; 11/70; p. 1581– 1582; 340– 174 TF.

IBM Technical Disclosure Bulletin, " Combustion And/Or Logic Device" by Genovese, Vol. 13, No. 6, 11/70 p. 1522, 1523; 340– 174 TF.

IBM Technical Disclosure Bulletin, " Bubble Domain Logic Devices" by Lin, Vol. 13, No. 10, 3/71, p. 3068– 3068a; 340–174 TF.

IBM Technical Disclosure Bulletin, " Read/Write Control" by Walker, Vol. 13, No. 11, 4/71, p. 3474– 3475; 340– 174 TF.

*Primary Examiner*—Stanley M. Urynowicz, Jr.

*Attorney*—R. J. Guenther and Kenneth B. Hamlin

[57] ABSTRACT

An overlay of magnetically soft material juxtaposed with a slice of a magnetic material in which single wall domains can be moved is of a geometry to define an intersection between two input and two output channels such that one of the output channels provides a logical OR function or a logical AND function depending on the presence or absence of a domain in a control channel while the other of the output channels simultaneously exhibits a logical AND function or a logical OR function, respectively.

5 Claims, 15 Drawing Figures

INVENTOR
W. F. CHOW
BY Herbert M. Shapiro
ATTORNEY

FIG. 12
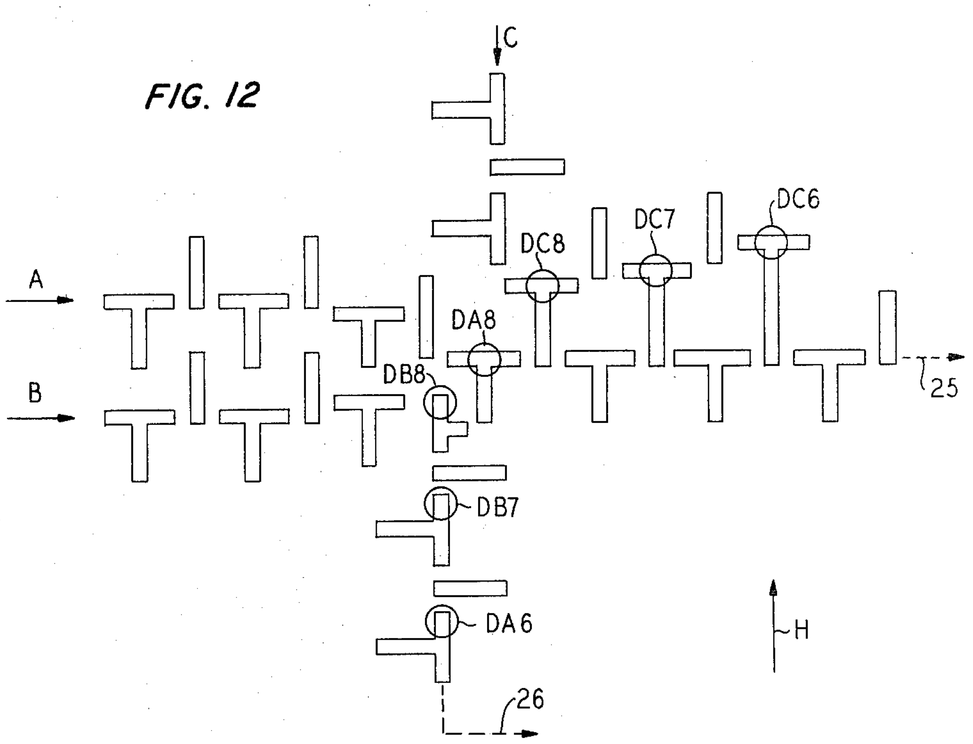
FIG. 13
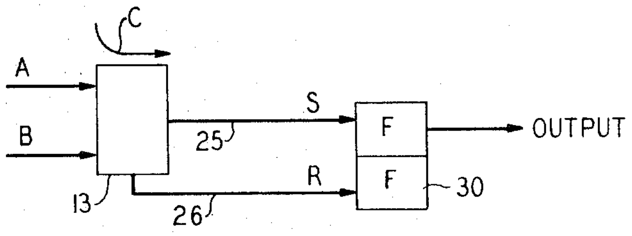
FIG. 14
| | | | | | | | | |
|---|---|---|---|---|---|---|---|---|
| S | 1 | 0 | 0 | 0 | 1 | 1 | 1 | 0 |
| R | 1 | 1 | 1 | 0 | 1 | 0 | 0 | 0 |
| OUTPUT | | | | | | | | |
FIG. 15
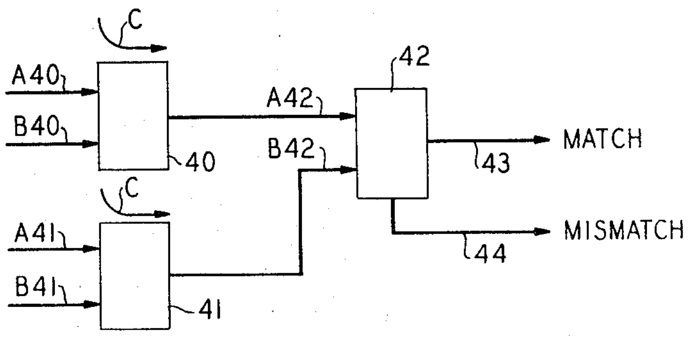

MAGNETIC DOMAIN LOGIC ARRANGEMENT

FIELD OF THE INVENTION

This invention relates to data processing arrangements, particularly arrangements which capitalize on the capabilities of single wall magnetic domain devices for their realization.

BACKGROUND OF THE INVENTION

A single wall domain is a magnetic domain encompassed by a single domain wall which closes on itself in the plane of the medium in which it moves. Such a domain is a stable, self-contained entity free to move anywhere in the plane of the medium in response to offset attracting magnetic fields.

Magnetic fields for moving domains are often provided by an array of conductors pulsed individually by external drivers. The shape of the conductors is dictated by the shape of the domain and by the material parameters. Most materials suitable for the movement of single wall domains exhibit a preferred direction of magnetization normal to the plane of movement and are magnetically isotropic in the plane. Conductors suitable for domain movement in such materials are shaped as conductor loops providing magnetic fields in first and second directions along an axis also normal to the plane. By pulsing a succession of conductors of the array consecutively offset from the position of a domain, domain movement is realized. In practice, the conductors are interconnected serially in three sets to provide a familiar three-phase shift register operation. The use of single wall domains in such a manner is disclosed in U.S. Pat. No. 3,460,116 of A. H. Bobeck, U. F. Gianola, R. C. Sherwood, and W. Shockley, issued Aug. 5, 1969.

An alternative propagation technique involves the generation of reorienting fields in the plane of movement of domains. Such a technique employs an overlay of magnetically soft elements oriented with respect to one another to respond to a uniform in-plane field to generate changing magnetic pole patterns which attract domains to consecutive positions in a propagation channel.

The latter propagation technique is particularly useful for large capacity sequential memories such as disc files. In such arrangements, no electrical conductors are employed except, perhaps, where a peculiar function is to be implemented locally. But advantage may be taken of the geometry of the magnetic overlay to build in certain logic functions without using conductors. For example, a domain generator which avoids the necessity for electrical conductors is shown in copending application Ser. No. 756,210, filed Aug. 29, 1968, now U.S. Pat. No. 3,555,527 for A. J. Perneski.

BRIEF DESCRIPTION OF THE INVENTION

In accordance with the present invention, magnetically soft overlay elements are disposed adjacent the surface of a slice of material in which single wall domains can be moved to define interaction positions or an intersection between a plurality of domain propagation channels. The presence of a domain moving in an output channel represents a logical OR or logical AND operation between information moving previously into the intersection from a pair of input channels depending on the simultaneous absence or presence of a domain moved along an independent control channel into the intersection.

In an illustrative embodiment, bar and T-shaped overlay elements are employed to define an intersection, first and second input and output channels, and a control channel for movement of domains in response to a rotating in-plane field. An interaction between domains in the input channels causes a deflecting of one of the domains from a preferred position in the first output channel to an alternative position in the second output channel. The simultaneous presence of a domain in the control channel similarly causes deflection to the alternative position of a domain which reaches the preferred position.

BRIEF DESCRIPTION OF THE DRAWING

FIGS. 2–12 are schematic illustrations of portions of the arrangement of FIG. 1 showing the magnetic conditions therein during operation.

FIGS. 13 and 15 are block diagrams of circuitry employing arrangements of the type shown in FIG. 1; and FIG. 14 is a table of inputs and outputs for the circuitry of FIG. 13.

DETAILED DESCRIPTION

Figure 1:
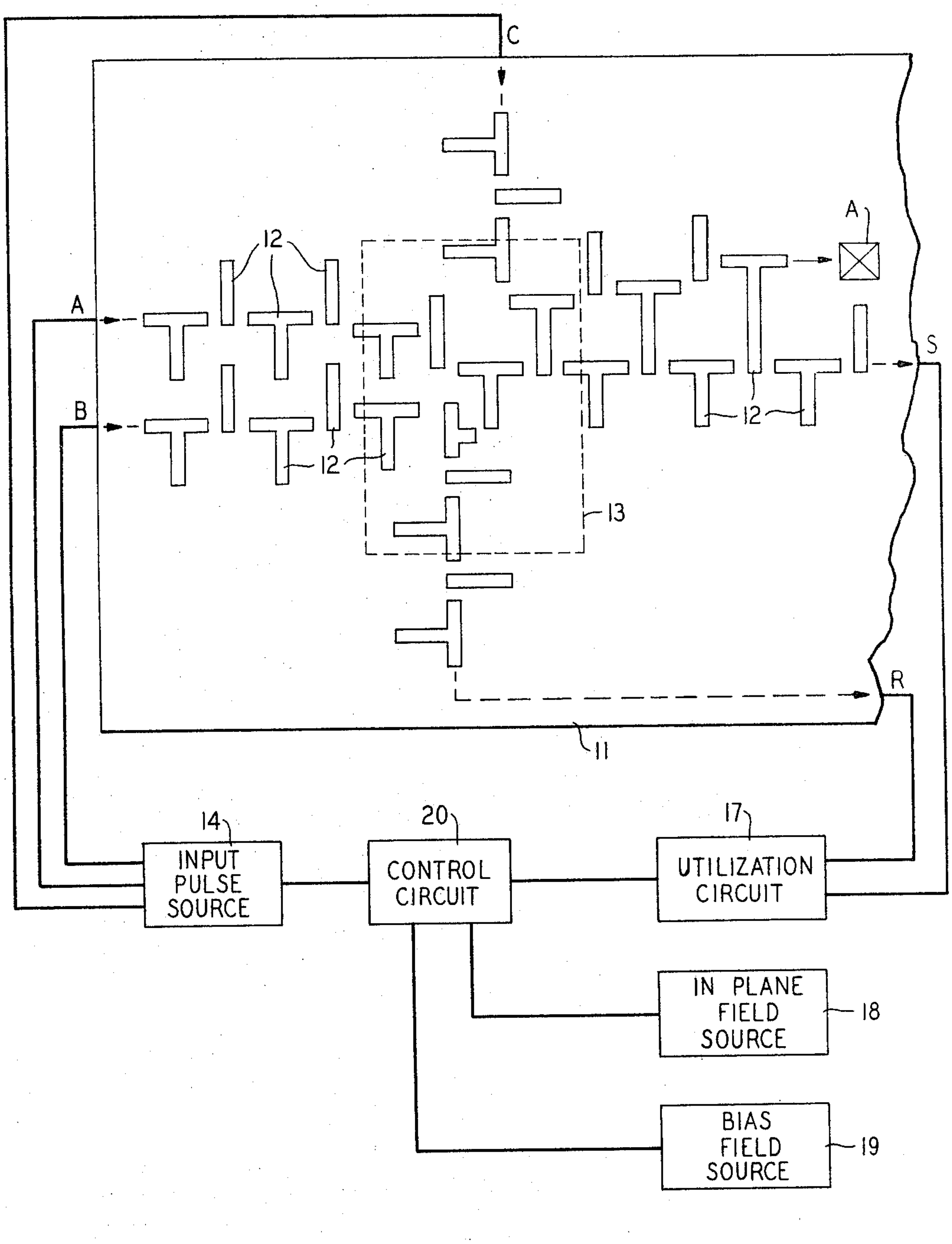
FIG. 1 is a schematic illustration of a domain logic arrangement in accordance with this invention.

FIG. 1 shows a layer or slice 11 of material in which single wall domains can be moved. A pattern of overlay elements 12 define, illustratively, two input propagation channels A and B, two output channels (to S and R) and an intersection. The intersection is indicated by the broken line 13 in FIG. 1.

Domains introduced to channels A and B at the left as viewed in FIG. 1 interact (in pairs) at the intersection to provide logic functions resulting in a domain pattern indicative thereof moving along the output channels to S and R. The resulting patterns in the output channels depend on the domain pattern moving synchronously along a control channel C.

An input pulse source suitable for generating input and control domains is well known and is represented here by a block 14 in FIG. 1 without detailed description. Alternatively, domains may be provided by other domain propagation channels (not shown) defined in layer 11 and is well understood. Similarly, a suitable detector for domain patterns in the output channels is represented by block 17 designated "utilization circuit" in FIG. 1. Channel C terminates in a domain annihilator indicated by block A in FIG. 1.

Input domains are moved in sheet 11 along the paths defined by the arrangement of overlay elements illustratively in response to a magnetic field rotating clockwise in the plane of the sheet in a manner now well understood. An in-plane field source for providing such a field is represented by block 18 in FIG. 1. Domains, so moved, are maintained at a nominal diameter by a familiar bias field, a source of which is represented by block 19 is FIG. 1.

Sources 14, 18, and 19, and circuit 17 are connected to a control circuit 20 for synchronization and activation.

The overlay geometry at the intersection 13 is designed to implement logic functions between each pair of information representations (viz. domain or an absent domain in each channel) moving along channels A and B synchronously where the logic function performed depends on the representation moving synchronously in control channel C into the intersection.

The operation of the intersection is most easily understood in terms of a series of illustrations, FIGS. 2–12, which show domain positions for representation sequences in channels A and B, both with and without a domain present simultaneously in the control channel, as well as the inplane field orientation for effecting those positions.

First the general operation of the overlay at the intersection will be discussed. Thereafter, consecutive domain positions will be shown to illustrate the manipulation of representative input information.

In the ensuing discussion the presence and absence of a domain represent a binary one and a binary zero respectively. Information is represented therefore as a pattern of domains moving from left to right in FIG. 2 in response to a rotating in-plane field. Control information is introduced to channel C at the top as viewed in FIG. 2 and moves downward synchronously. The illustrative input information in channels A and B is 10101010 and 11001100, respectively, reading from left to right as viewed in FIG. 2. The illustrative control information is 11110000 reading from top to bottom as viewed in the figure. The information can be recognized as a familiar binary code and has been chosen arbitrarily to illustrate the operation of a conditional transmission gate in accordance with this invention.

Figure 2:
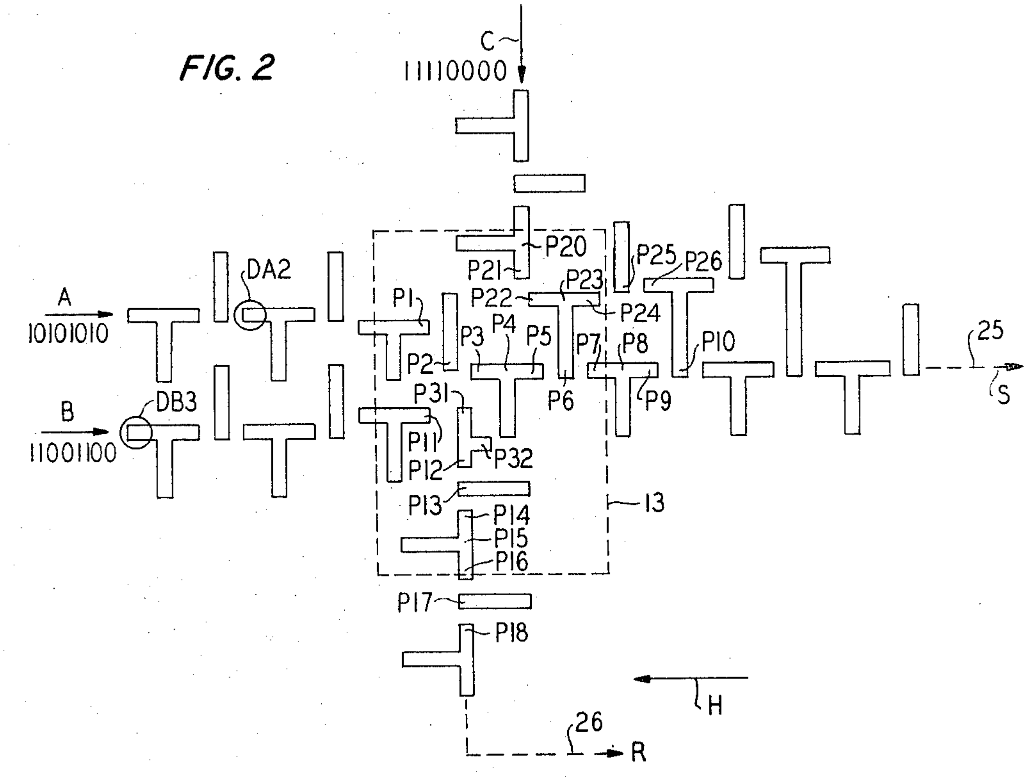

As the in-plane field, indicated by arrow H in FIG. 2 rotates clockwise, domain patterns representative of the input and control information move to the right and downward respectively. The presence of a domain is represented by a circle designated by the channel along which it moves accompanied by a number representing its consecutive position in the input (or control) sequence reading from right to left. For example, the first digits on channels A and B are zero—no representations occur. The second digits are a one and a zero. The designation for the one in channel A is DA2.

Intersection 13 of FIG. 2 has an overlay geometry such that domains move along output channel 25 or 26 depending on the associated information moving previously along channels A and B along control channel C. If, for example, there is a domain moving along channel A but not channel C, the domain in channel A follows the path P1, P2, through P10 through the intersection as shown in FIG. 2 and moves along channel 25 to S. This is the situation represented by the second in the sequence of inputs (see domain DA2 below). The same result occurs when a domain moves along channel B in the absence of a domain moving along channels A and C synchronously.

On the other hand, if domains move synchronously along channels A and B in the absence of a domain moving synchronously along channel C, the domains in channel A take the path P1 through P10 as above and the domain in channel B is directed, because of interaction between the two domains, into path P11, P12 through P18 of FIG. 2 along output channel 26 to R. This is the situation with the fourth in the assumed sequence of input information (see domains DA4 and DB4 below).

It may be recognized that in the absence of a domain in a synchronous position in channel C, a single domain in either channel A or B moves to channel 25 whereas domains occurring simultaneously in each of channels A and B produce a domain in each of channels 25 and 26. Channel 25 can be recognized to provide an OR output whereas channel 26 provides an AND output.

This is not the case when a domain is moved synchronously along channel C. To the contrary, such a domain interacts with domains moving along channels A and B to modify the operation described above. A domain moving along channel C, for example, occupies the consecutive positions P20, P21 through P26. In positions P22 and P23, such a domain interacts with a domain simultaneously in position P3. In this situation, a domain in either channel A or B is forced to take the path P3, P31, P32, P12, P13, P14, and P15 along channel 26. This is the situation for the sixth of the sequence of inputs (see domains DA6 and DB6 below).

When both channels A and B have domains moving synchronously therealong with a domain present in channel C, the domain in channel A follows the path P1 through P10 moving along channel 25. The domain in channel B, on the other hand, follows the path P11 through P18 moving along channel 26. This is the situation with the last of the assumed sequence of inputs (see domains DA8 and DB8 below).

It may be recognized that channel 25 provides the AND output in this instance whereas channel 26 provides the OR output. Consequently, a controllable gate (or a conditional transmission gate) is realized.

Consider the movement of domain patterns representative of the assumed illustrative example approaching intersection 13 of FIG. 2. We will initiate the operation with a showing of the domain disposition for the first three representations in channels A, B, and C as the in-plane field, represented by arrow H, rotates clockwise from a leftward directed orientation shown in FIG. 2 to an upward orientation shown in FIG. 3. Only domains DA2 and DB3 appear as is consistent with the assumed illustrative information.

Figure 3:
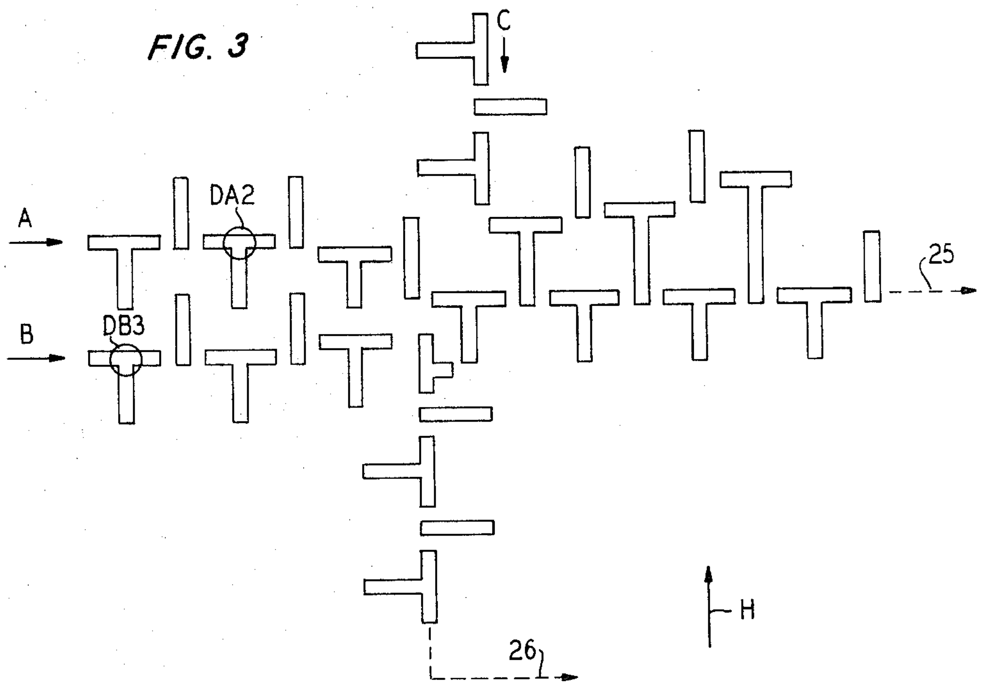
Figure 4:
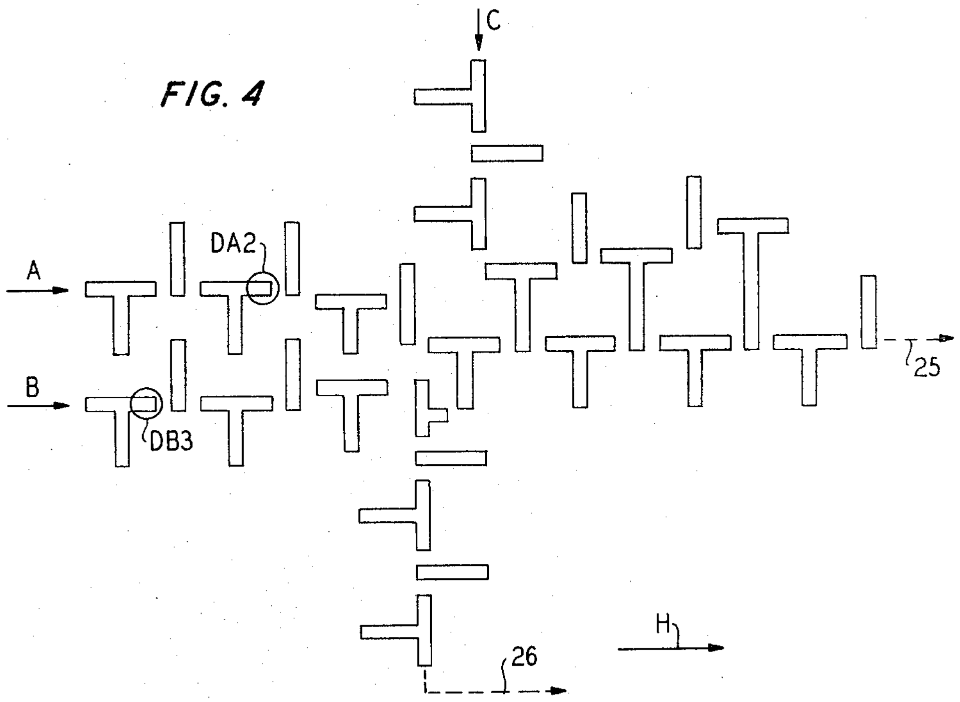

When the in-plane field (arrow H) rotates to an upward position domains occupy the positions as shown in FIG. 3. In FIG. 4, the in-plane field is directed to the right causing information to advance.

Figure 5:
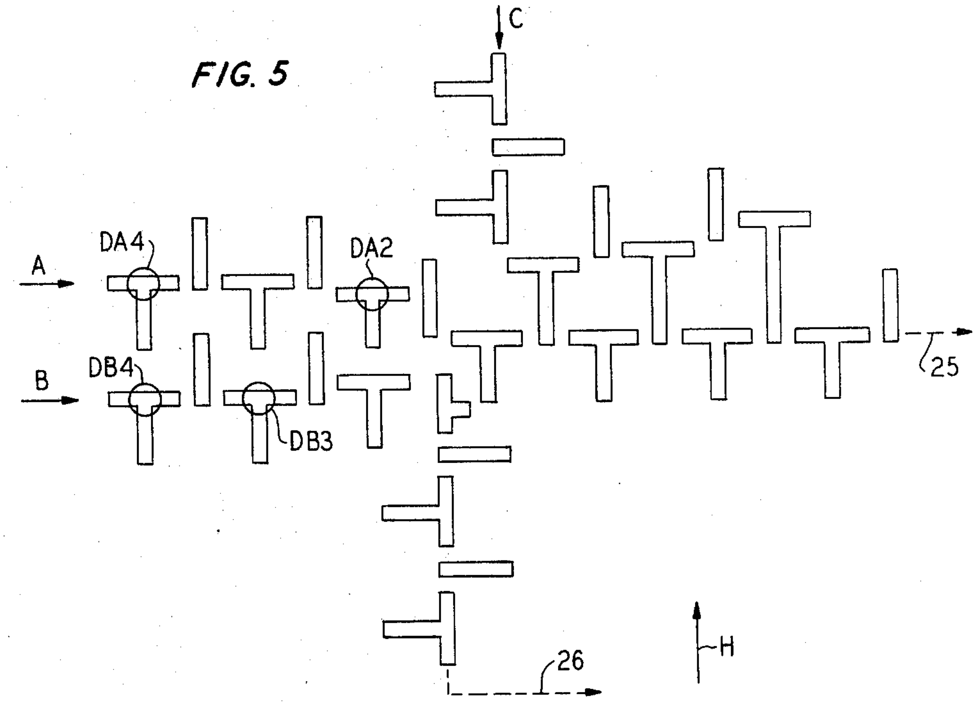

FIG. 5 shows the in-plane field when it is next directed upward initiating a next subsequent cycle of operation. At this juncture, the fourth representations are introduced to the portion of the arrangement depicted.

Figure 6:
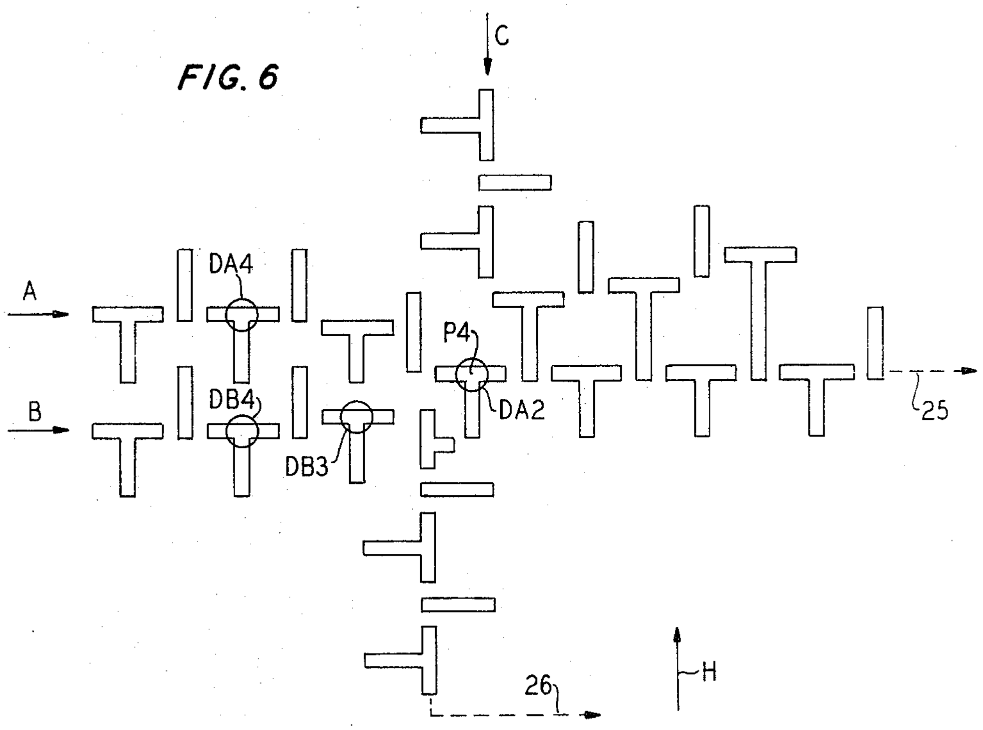
Figure 7:
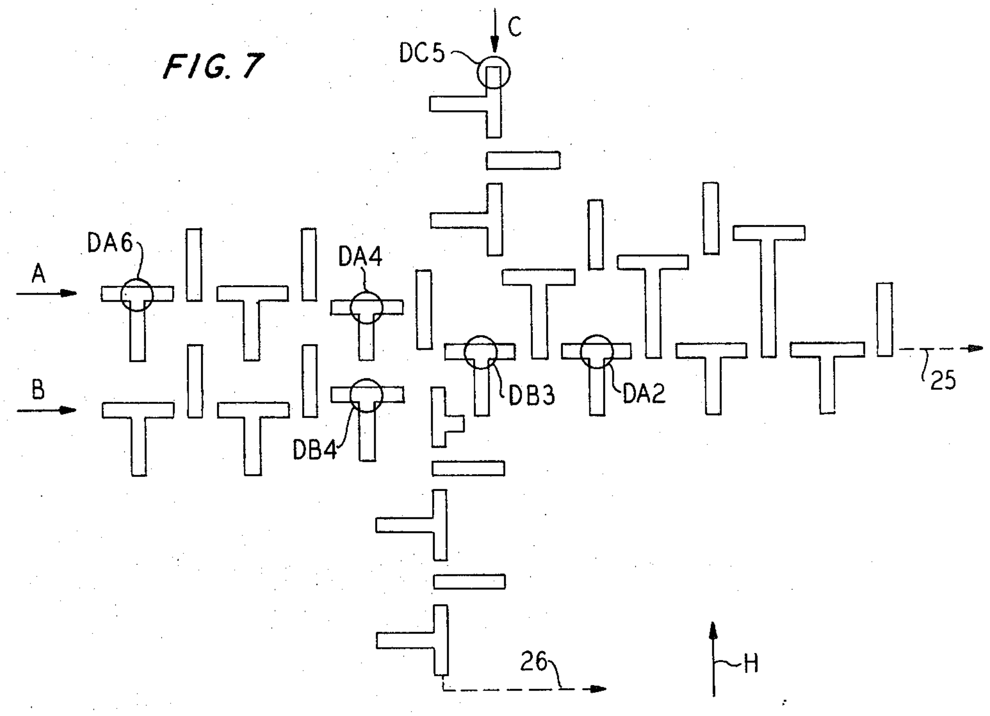

FIGS. 6 and 7 show the domain patterns when the in-plane field is oriented upward in the next two cycles of the in-plane field as represented by the arrows H in those figures. The domain DC5 appears in the portion of the control channel shown in FIG. 7 at this juncture.

Figure 8:
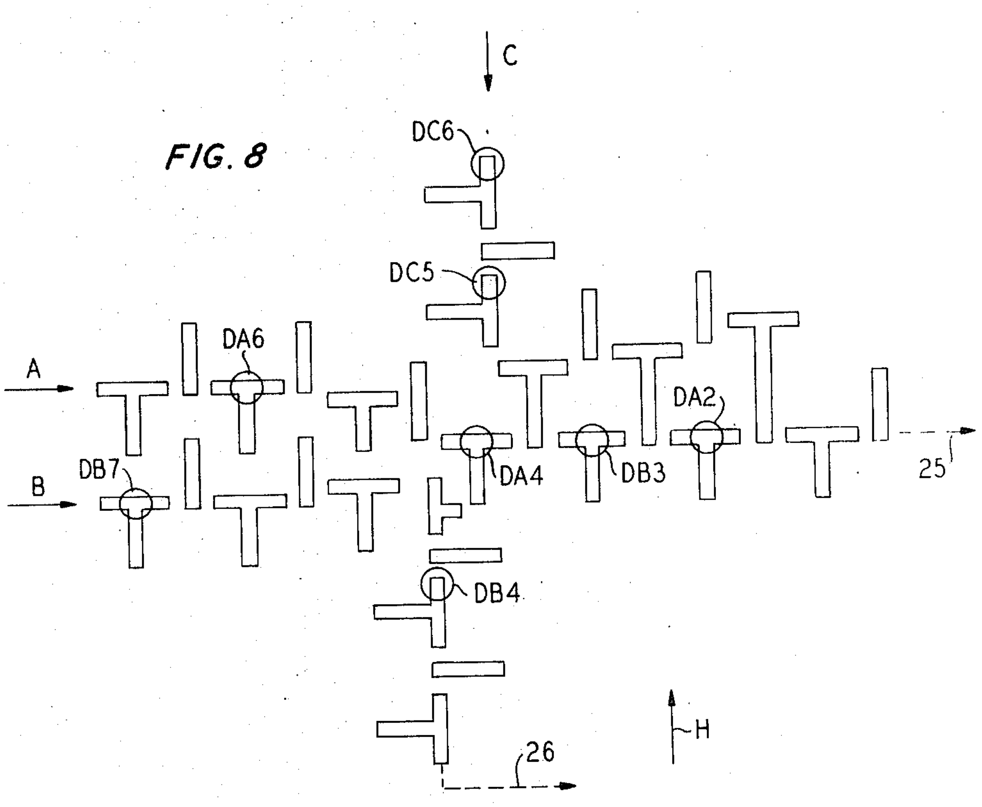

In FIG. 8, the in-plane field is shown advanced through another cycle. Domain DB4 is shown deflected, by the simultaneous occurrence of domain DA4, into channel 26. The overlay pattern at the intersection does not provide an alternative path for domains in channel A. Consequently, only a domain in channel B is so deflected.

Figure 9:
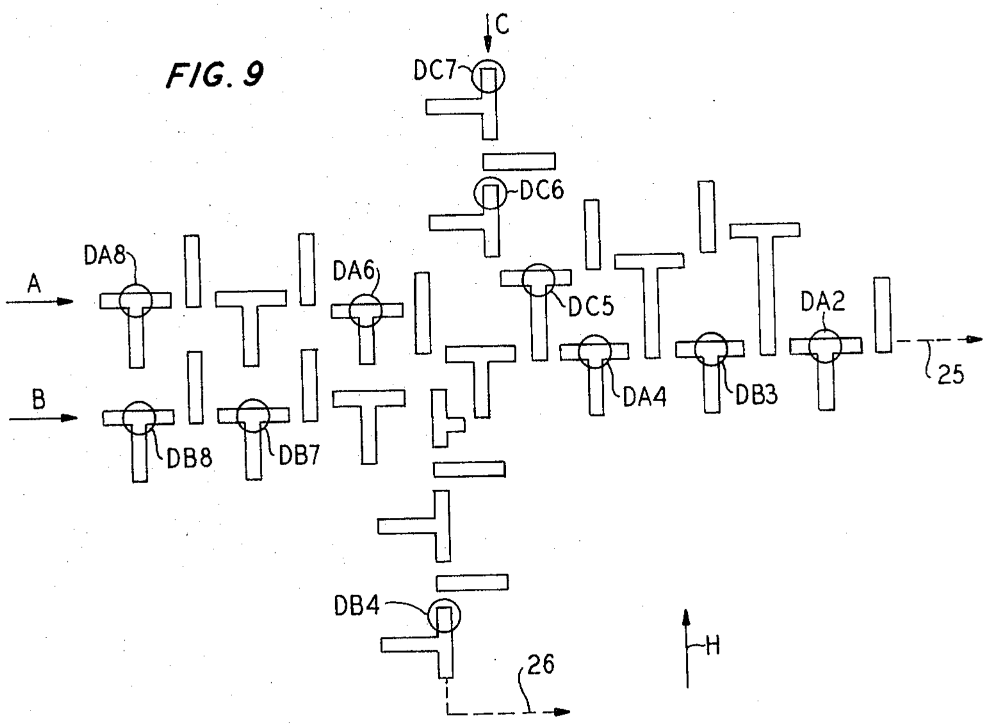

FIG. 9 shows all the input information in positions consistent with an upward directed in-plane field at the outset of the next cycle of the in-plane field. Domains DA2, DB3, and DA4 are advanced along channel 25 while domain DB4 is advanced along channel 26.

Figure 10:
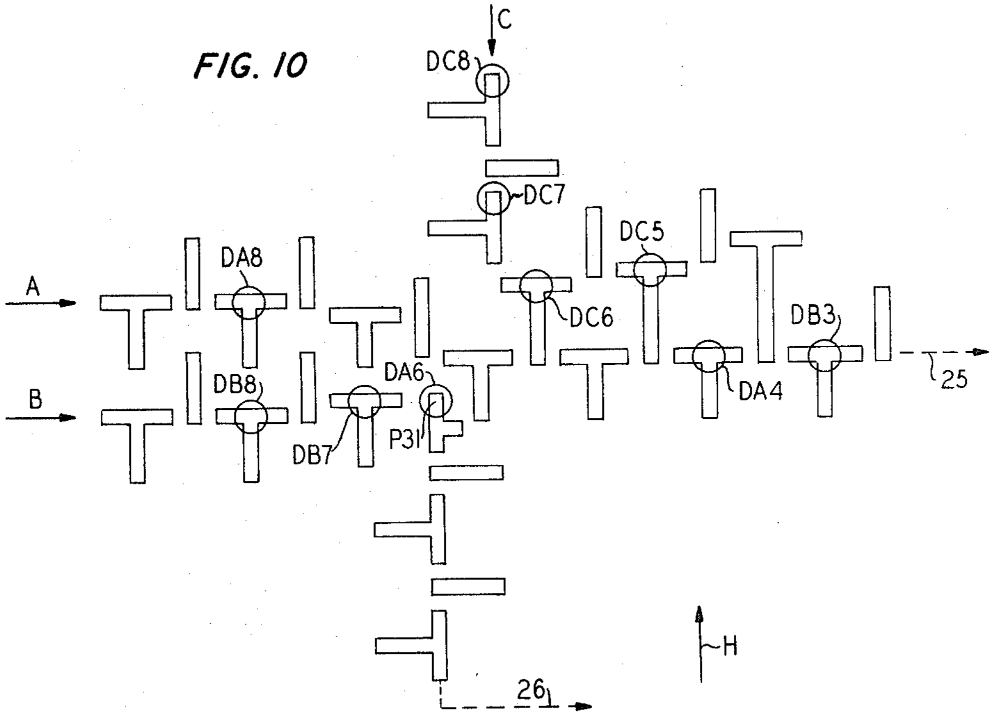
Figure 11:
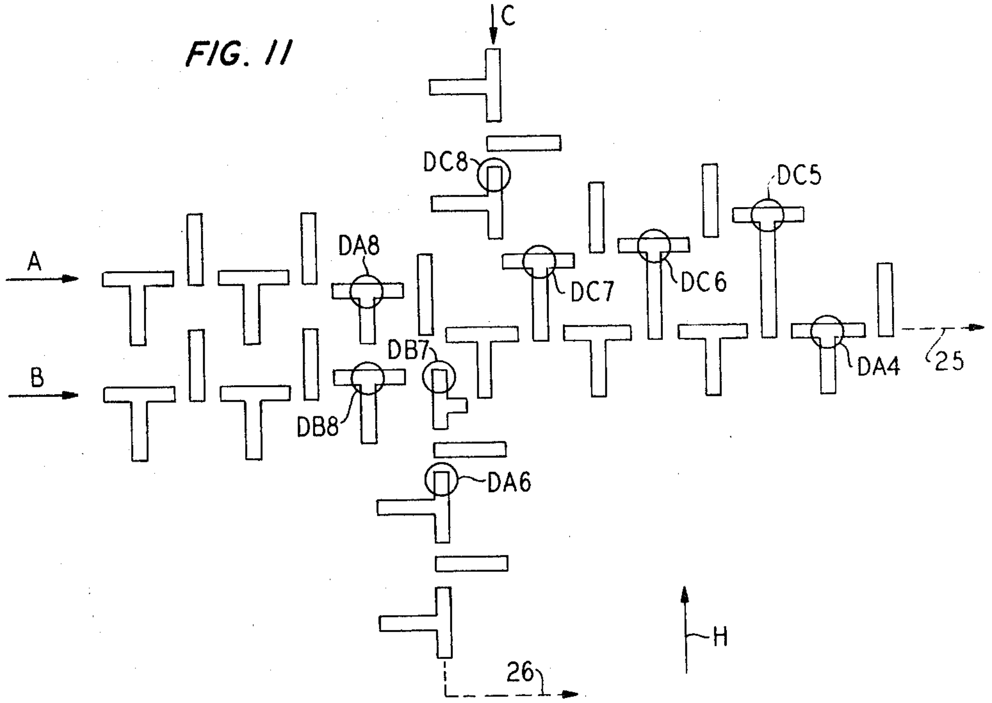

FIGS. 10, 11, and 12 show the domain dispositions for the next three cycles when the field is oriented upward during each cycle. It is to be noted that the sequences of FIGS. 2–9 show that a domain in either of channels A or B in the absence of a domain moving synchronously in the other of the two channels results in a domain moving along channel 25 when unaccompanied by a control domain. This is clear from FIGS. 6, 7, and 8. Consequently, in the absence of a control domain, the OR function is represented at the output of channel 25.

FIG. 8, on the other hand, also shows domain DB4 moving along channel 26. Domain DB4 is moving synchronously with domain DA4 in the absence of a control domain. In this situation, outputs occur in channels 25 and 26, the former representing the OR function, the latter the AND function.

For FIGS. 9, 10, 11, and 12, a control domain is present when consecutive information pairs advance into the intersection 13 of FIG. 2. The domains are disposed as shown in the figures for consecutive cycles of the in-plane field when the field is directed upward as represented by arrows H. Consequently, a domain moving along either of channels A or B interacts with a control domain and is deflected downward into channel 26 for producing an OR function at the output there. The deflection of the domain in this instance can be understood by a comparison of the position of domain DA6 in FIG. 10 with that of domain DA2 in FIG. 6. FIG. 12, on the other hand, shows domains (DA8 and DB8) moving synchronously in channels A and B in the presence of a control domain. Consequently, not only is domain DB8 deflected to produce the OR function at the output of channel 26, but also domain DA8 moves along channel 25 to produce the AND function.

It is clear then that the pattern of elements shown provides OR and AND functions and AND and OR functions at first and second outputs respectively depending on the absence or presence of a control domain as stated above in response to an illustratively rotating in-plane field.

FIG. 13 shows a block diagram of an arrangement in which the outputs of channels 25 and 26 of FIG. 2, as described above, are applied to set and reset inputs R and S of FIG. 1 of a conventional flip-flop 30 by a suitable detector (not shown). FIG. 14 shows a table of those outputs along with the resulting output signal thus illustrating the operation of the arrangement as a conditional transmission gate.

FIG. 15 shows a plurality of blocks 40, 41, and 42, each representing a domain arrangement, as described, employed as a module of a comparator. Binary digits are applied at A40 and B40 and the complements of those digits are applied at A41 and B41 as described above. The like outputs of arrangements 40 and 41 are applied to the inputs A42 and B42 of arrangement 42 for providing match and mismatch indications at 43 and 44, respectively.

What has been described is considered merely illustrative of the principles of this invention. Therefore, various modifications can be devised by those skilled in the art in accordance with those principles within the spirit and scope of this invention. For example, a T-bar overlay geometry has been shown illustratively for a clockwise rotating in-plane field. But this T-bar overlay is different if the field rotates counterclockwise. Also, a Y-bar geometry may be used for a rotating field, as can elements of much different geometry. Further, other geometries may be used if the in-plane field reorients in a different sequence.

What is claimed is:

1. A combination comprising a layer of material in which single wall domains can be moved, a pattern of elements for defining first, second, and third channels for said domains for moving said domains in response to a magnetic field reorienting in the plane of said layer, said channels having first, second, and third inputs and said first and second channels having first and second outputs, respectively, said pattern defining an intersection between said channels, said pattern at said intersection having a geometry such that said first output exhibits first and second logical functions of domain patterns moved synchronously along said first and second channels into said intersection, depending on the synchronous movement of the presence or absence of a domain in said third channel, respectively.

2. A combination in accordance with claim 1 wherein said second output simultaneously exhibits said second and first logical functions of said domain patterns depending on the synchronous movement of the presence or absence of a domain in said third channel, respectively.

3. A combination in accordance with claim 2 wherein said in-plane field reorients by rotation and said pattern comprises consecutive elements having long dimensions disposed to move domains as said in-plane field rotates.

4. A domain propagation arrangement comprising a layer of material in which single wall domains can be moved, a pattern of elements for defining in said layer first, second, and third propagation channels having first, second, and third inputs and first and second outputs, respectively, said elements also defining an intersection between said first and second channels such that preferred and alternative positions exist for domains moving in either channel alone or in both channels synchronously for passage to said first or first and second outputs, respectively, in the absence of a domain moving synchronously therewith in said third channel, said elements at said intersection having a geometry such that the presence of a domain in said third channel deflects a domain moving synchronously therewith along said first or second channel to said second output and permits the passage of domains moving synchronously in said first and second channels to said first and second outputs, respectively.

5. Apparatus comprising a slice of a magnetic material in which single wall domains can be moved and having a first surface, an overlay of magnetically soft material juxtaposed with said surface, said overlay comprising a plurality of elements for moving domains therealong in response to a magnetic field reorienting in the plane of said slice, said elements being arranged to define first and second input channels, first and second output channels and a control channel having a common intersection, said elements at said intersection having a geometry such that a domain moving along one of said first or second input channels in the absence of domains moving synchronously along the other of said input channels or along said control channel moves to said first output channel, domains moving synchronously along both of said first and second input channels in the absence of a domain moving synchronously along said control channel, move along said first and second output channels, respectively, and domains moving along either of said first or second input channel and said control channel move along said second output channel and said control channel and domains moving along both said first and second input channel and said control channel move, respectively, along said first and second output channels and said control channel.

* * * * *